(12) United States Patent
Bini et al.

(10) Patent No.: US 9,701,770 B2
(45) Date of Patent: Jul. 11, 2017

(54) CATALYST FOR THE POLYMERISATION OF OLEFINS, PROCESS FOR ITS PRODUCTION AND USE

(71) Applicant: INEOS Europe AG, Vaud (CH)

(72) Inventors: Fabien Bini, Marseille (FR); Paul Fiasse, Brussels (BE); Luc Girardot, Chateaneuf les Martigues (FR); Benoit Koch, Hannut (BE)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 14/391,827

(22) PCT Filed: Apr. 16, 2013

(86) PCT No.: PCT/EP2013/057935
§ 371 (c)(1),
(2) Date: Oct. 10, 2014

(87) PCT Pub. No.: WO2013/156491
PCT Pub. Date: Oct. 24, 2013

(65) Prior Publication Data
US 2015/0080541 A1  Mar. 19, 2015

(30) Foreign Application Priority Data

Apr. 19, 2012  (EP) .................................. 12164770

(51) Int. Cl.
*C08F 210/16* (2006.01)
(52) U.S. Cl.
CPC .................. *C08F 210/16* (2013.01)
(58) Field of Classification Search
None
See application file for complete search history.

(56) References Cited

U.S. PATENT DOCUMENTS

| | | | |
|---|---|---|---|
| 3,901,863 A | 8/1975 | Berger et al. | |
| 4,292,200 A | 9/1981 | Berger et al. | |
| 4,617,360 A | 10/1986 | Bienfait | |
| 5,932,514 A | 8/1999 | Ernst et al. | |
| 6,034,188 A | 3/2000 | Sano et al. | |
| 6,410,475 B1 | 6/2002 | Detrez et al. | |
| 6,545,106 B1 | 4/2003 | Bian | |
| 7,259,125 B2 | 8/2007 | Apecetche et al. | |
| 7,449,528 B2 * | 11/2008 | Masi ....................... C07C 53/16 502/103 |
| 2007/0265402 A1 | 11/2007 | Apecetche et al. | |
| 2011/0306737 A1 | 12/2011 | Garoff et al. | |

FOREIGN PATENT DOCUMENTS

| | | |
|---|---|---|
| DE | 44 14 526 A1 | 4/1994 |
| EP | 0 604 850 A2 | 7/1994 |
| EP | 0 744 416 A1 | 11/1996 |
| WO | WO 89/02446 A1 | 3/1989 |
| WO | WO 91/08239 A1 | 6/1991 |
| WO | WO 91/09881 A1 | 7/1991 |
| WO | WO 94/00498 | 1/1994 |
| WO | WO 95/35323 A1 | 12/1995 |
| WO | WO 99/05187 A1 | 2/1999 |
| WO | WO 2007/137713 A1 | 12/2007 |

OTHER PUBLICATIONS

Atiqullah, M., et al; "Influence of silica calcination temperature on the performance of supported catalyst $SiO_2$-"$BuSnCl_3$/MAO/("$BuCp$)$_2ZrCl_2$ polymerizing ethylene without separately feeding the MAO cocatalyst"; *Applied Catalysis A: General* 320, (2007), pp. 134-143.

* cited by examiner

*Primary Examiner* — Catherine S Branch
(74) *Attorney, Agent, or Firm* — Nixon & Vanderhye P.C.

(57) ABSTRACT

Silica supported catalyst composition useful in olefin polymerization, having a $SiO_2$ content not more than 70 weight %, a transition metal (M) content between 2.5 and 9.1 weight %, a magnesium content between 0.5 and 3.3 weight %, an aluminium content between 0.3 and 5 weight % and a chlorine content between 5 and 30 weight %. The silica support has, prior to addition of catalytically active ingredients, a residual surface hydroxyl content between 0.6 and 2 mmole/g of silica, and the molar ratio of transition metal (M) to magnesium is between 0.3 and 2.5.

24 Claims, No Drawings

CATALYST FOR THE POLYMERISATION OF OLEFINS, PROCESS FOR ITS PRODUCTION AND USE

This application is the U.S. national phase of International Application No. PCT/EP2013/057935, filed Apr. 16, 2013 which designated the U.S. and claims priority to European Patent Application No. 12164770.5, filed Apr. 19, 2012, the entire contents of each of which are hereby incorporated by reference.

The present invention relates to supported Ziegler-Natta catalysts, which are useful in olefin polymerization, and more particularly useful in the continuous fluidized bed gas phase and slurry polymerization of alpha-olefins. The present invention details a method for producing these catalysts as well as identifies a method to use them in a gas phase or slurry process to produce polyethylene.

Ziegler-Natta type catalysts are well known and have been used since the early 1950's. Generally, the catalyst comprises a transition metal compound, typically titanium in the 3 or 4 valence state (e.g. $TiCl_3$ or $TiCl_4$) supported on magnesium chloride.

In some cases, the catalysts are prepared in conjunction with an electron donor, which is used to dissolve the $MgCl_2$ and $TiCl_3$ when they are used. This type of formulation teaches away from the current disclosure.

Alternately, the catalysts may be prepared from the addition of magnesium chloride to the support and consecutive addition of the Ti species. Again, this type of formulation teaches away from the current disclosure.

Alternately, the catalysts may be prepared on a support which is pre-treated with organosilicon compound. Again, this type of formulation teaches away from the current disclosure.

The present invention seeks to provide a process for the polymerization of olefin polymers, preferably polymers of ethylene characterised in that the catalytic system exhibits a superior response to hydrogen, a surprisingly high productivity and an improved activity profile.

The inventors have unexpectedly found that both the catalyst activity and the response to hydrogen can be unexpectedly high by using the invention catalyst prepared by following the order of addition and the specific catalyst components.

PREPARATION

The present invention provides a process for preparing an alpha-olefin polymerization catalyst composition comprising
  in a first stage, the formation of a Mg-M liquid complex (M is a transition metal) in the absence of halogen containing compound by reacting at least one organic oxygen-comprising compound of magnesium with at least one organic oxygen-comprising compound of a transition metal,
  in a second stage, the impregnation of a silica support by means of the said Mg-M liquid complex, and
  in a subsequent stage, the precipitation of the said Mg-M liquid complex on the silica by means of an halogenated organoaluminium compound,
wherein
  during the first stage reaction, the molar amount of the transition metal M added per mole of magnesium is comprised between 0.06 and 4, and
  the said silica support has, prior to the Mg-M liquid complex impregnation, a residual surface hydroxyl content comprised between 0.6 and 2 mmole/g of silica.

Silica

The silica support for the catalysts useful in the present invention typically comprises silica having a pendant reactive hydroxyl radical. It is critical according to the present invention that, before its impregnation with the Mg-M liquid complex, the silica exhibits a residual surface hydroxyl content comprised between 0.6 and 2 mmole/g of silica, preferably between 1 and 1.6 mmole/g of silica.

The silica support is preferably spherical and/or spheroidal. For the purpose of the present invention and appended claims, spheroidal morphology means shaped like a sphere but not perfectly round, especially an ellipsoid shape that is generated by revolving one or more ellipse around one of its axes. Thus, for the purpose of the present invention and appended claims, by "spherical and/or spheroidal morphology", it is meant that the silica support exhibits spherical and/or spheroidal shape morphology. Such spherical and/or spheroidal morphology of said silica support is usually identified by taking microscopy pictures of said support; this is currently how the man skilled in the art can identify the presence of a spherical and/or spheroidal particles.

The spherical and/or spheroidal silica support may suitably be prepared by spray drying of washed and aged hydrogel particles or spray setting of a hydrosol. Such processes are well known in the art and typically result in spherical and/or spheroidal particles. The particle size may be adjusted by selection of conditions. In this invention the median (volume) particle diameter of the spherical and/or spheroidal particles measured after drying is preferably from 10 to 250 μm, preferably from 20 to 200 μm and most preferably from 20 to 150 μm. The International Standard ISO 13320:2009 ("Particle size analysis—Laser diffraction methods") can be used for measuring said median particle size characteristic. Particle diameters are indeed typically measured using light scattering techniques. For example, Malvern Instruments' laser diffraction systems can advantageously be used, e.g. a Malvern Mastersizer S or a Malvern Mastersizer 2000; such instrument together with its operating manual meets or even exceeds the requirements set-out within the ISO 13320 Standard; the Malvern wet dispersion procedure (Qspec Large volume sample dispersion unit) is preferably selected.

The resulting spherical and/or spheroidal particles may be further classified e.g. by sieving to tailor the median particle diameter and reduce the amounts of fine and/or coarse particles. Although handling of the particles may lead to some degree of breakage, particles are preferably not subjected to any deliberate comminution processes. Preferably, the spherical and/or spheroidal particles are prepared by spray setting of a hydrosol, preferably a silica hydrosol. The resulting spherical and or spheroidal hydrogel particles are suitably subjected to washing and aging processes prior to water removal to generate suitable surface area and pore volume.

The silica support should preferably have an average particle size from about 0.1 to 150 microns, typically from 10 to 150 microns, preferably from about 20 to 100 microns. The silica support should preferably have a large surface area typically greater than about 100 $m^2/g$, preferably greater than about 250 $m^2/g$, most preferably from 300 $m^2/g$ to 1000 $m^2/g$. The silica support may preferably be porous and may have a pore volume from about 0.3 to 5.0 ml/g, typically from 0.5 to 3.0 ml/g. Surface area and pore volume may be determined according to BET volumetric method in British Standard BS 4359/1 (1984).

For reducing the level of surface hydroxyl (OH) groups, the silica support can advantageously be heat treated and/or chemically treated. After treatment the support may be put into a mixing vessel and slurried with an inert solvent or diluent preferably a hydrocarbon and contacted with or without isolation or separation from the solvent or diluent of the catalyst components.

It is important that the support be dried prior to impregnation; however, the Applicants have found that a mild treatment is most preferred in order to retain the desired surface hydroxyl group content characteristics of the support. Generally, the support may be heated at a temperature of at least 200° C. for up to 24 hours, typically at a temperature from 200° C. to 400° C. (more preferably between 250° C. to 350° C.) for about 2 to 20, preferably 4 to 10 hours. The resulting support will be free of adsorbed water and should have a surface hydroxyl content from about 0.6 to 2 mmole/g of support, preferably from 1 to 1.6 mmole/g of support.

A silica suitable for use in the present invention has a high surface area and is amorphous. For example, commercially available silicas are marketed under the trademark of ES-70W by PQ Corporation; such ES-70W silica is a microspheroidal support exhibiting the following specifications: an APS Mastersizer comprised between 35 and 47 microns (with D10 of 10.0 microns min and D90 of 85.0 microns max), a Pore Volume (IPA) comprised between 1.55 and 1.75 ml/g, and a Surface Area (5 point BET) comprised between 260 and 330 m$^2$/g. Another silica suitable for use in the present invention is a commercially available silica marketed under the trademark of SYLOPOL® 2408D by Grace; this is a white powder consisting of synthetic, amorphous silica, exhibiting the following specifications: a nitrogen pore volume higher than 1.35 cc/g; a surface area comprised between 280 and 355 m2/g (with D10 of 10.0 microns min and D90 of 85.0 microns max).

The silica support for the catalysts useful in the present invention typically comprises more than 98% by weight of silicon dioxide, preferably more than 99% by weight of silicon dioxide.

A number of methods are known for determining the amount of the hydroxyl groups in silica; for example by using the method disclosed by J. B. Peri and A. L. Hensley, Jr., in J. Phys. Chem., 1968, 72 (8), pp 2926-2933, or any of the methods disclosed in "The surface chemistry of amorphous silica/Zhuravlev model (Colloids and Surfaces, A: Physiochemical and Engineering Aspects 173 (2000) pages 1-38); e.g. a mass spectrometric thermal analysis in conjunction with a temperature-programmed desorption method, or an infrared method (which can be combined with a thermogravimetric adsorption measurement and/or an isotope exchange technique), or a chemical determination method such as the one disclosed by J. J. Fripiat and J. Uytterhoeven (J. Phys. Chem., 1962, 66 (5), pp 800-805, Hydroxyl Content In Silica Gel "Aerosil"). For the purpose of the present invention and appended claims the amount of hydroxyl groups in silica has been measured according to the following method: 2 g of the partially dehydrated silica is introduced into a closed vessel under inert atmosphere; 5 ml of CH3MgBr diluted in dibutyl ether is introduced into the vessel at atmospheric pressure and under a controlled temperature of 25° C.; the resulting mixture is agitated during 10 minutes in order to allow a complete reaction between the hydroxyl groups of the silica and the CH3MgBr reactant (in excess) with the corresponding liberation of C4 in the gas phase; said CH4 is then measured by a conventional gas chromatography method. The corresponding amount of hydroxyl groups per g of silica equals the amount of methane generated as determined from the GC measurement divided by 2 (i.e. the number of g of silica introduced in the vessel).

While heating is the most preferred means of partly removing OH groups inherently present in many carriers, such as silica, the OH groups may also be partly removed by other removal means, such as chemical means. For example, a desired proportion of OH groups may be reacted with a suitable chemical agent, such as a hydroxyl reactive aluminium compound (e.g. triethylaluminium).

The Mg-M liquid complex for the catalysts useful in the present invention is prepared by reacting at least one organic oxygen-comprising compound of magnesium with at least one organic oxygen-comprising compound of a transition metal.

Magnesium

The magnesium compound is an organic oxygen-comprising compound. The term "organic oxygen-comprising compound of magnesium" is understood to denote any compound in which an organic radical is bonded to magnesium via oxygen, that is to say any compound comprising at least one sequence of magnesium-oxygen-organic radical bonds per magnesium atom. The organic radicals bonded to magnesium via oxygen are generally chosen from radicals comprising up to 20 carbon atoms and more particularly from those comprising up to 10 carbon atoms. Good results are obtained when these radicals comprise from 2 to 6 carbon atoms. These radicals can be saturated or unsaturated, with a branched chain or with a straight or cyclic chain. They are preferably chosen from hydrocarbon-comprising radicals and in particular from alkyl (linear or branched), alkenyl, aryl, cycloalkyl, arylalkyl and acyl radicals and their substituted derivatives.

The organic oxygen-comprising compounds of magnesium can, in addition to the organic radicals bonded to magnesium via oxygen, comprise other radicals, such as, for example, the —OH, —(SO$_4$)$_{1/2}$, —NO$_3$, —(PO$_4$)$_{1/3}$, and —(CO$_3$)$_{1/2}$. They can also be organic radicals bonded directly to magnesium via carbon.

Mention may be made, among organic oxygen-comprising compounds of magnesium which can be used, of alkoxides (such as ethoxide and cyclohexanoate), alkylalkoxides (such as ethylethoxide), hydroxyalkoxides (such as hydroxymethoxide), phenoxides (such as naphthenate), or optionally hydrated carboxylates (such as acetate and benzoate). They can also be organic nitrogen-comprising oxygen-comprising compounds, that is to say compounds comprising sequences of magnesium-oxygen-nitrogen-organic radical bonds (such as oximates, in particular butyl oximate, or salts of hydroxylamine acids, in particular the derivative of N-nitroso-N-phenylhydroxylamine), chelates, that is to say organic oxygen-comprising compounds in which the magnesium has at least one sequence of normal bonds of the magnesium-oxygen-organic radical type and at least one coordination bond, so as to form a heterocycle in which the magnesium is included (such as enolates, in particular acetylacetonate), or silanolates, that is to say compounds comprising sequences of magnesium-oxygen-silicon-hydrocarbon-comprising radical bonds (such as triphenylsilanolate). Mention may also be made, as examples of organic oxygen-comprising compounds of magnesium, of those comprising several different organic radicals (such as magnesium methoxyethoxide), complex alkoxides and phenoxides of magnesium and of another metal (such as Mg[Al (OR)$_4$]$_2$) and mixtures of two or more of the organic oxygen-comprising compounds of magnesium defined above.

Use is preferably made, among all the magnesium compounds which are suitable, of those which only comprise magnesium-oxygen-organic radical bonds per magnesium atom, to the exclusion of any other bond. Magnesium alkoxides are particularly preferred. The best results are obtained with magnesium dialkoxides, in particular magnesium diethoxide.

Transition Metal

The compound of a transition metal (M) is an organic oxygen-comprising compound. The term "organic oxygen-comprising compound of a transition metal" is understood to denote any compound in which an organic radical is bonded to the transition metal via oxygen, that is to say any compound comprising at least one sequence of transition metal-oxygen-organic radical bonds per transition metal atom. The organic radicals bonded to the metal of transition via oxygen are generally chosen from radicals comprising up to 20 carbon atoms and more particularly from those comprising up to 10 carbon atoms. Good results are obtained when these radicals comprise from 2 to 6 carbon atoms. These radicals can be saturated or unsaturated, with a branched chain or with a straight or cyclic chain. They are preferably chosen from hydrocarbon-comprising radicals and in particular from alkyl (linear or branched), alkenyl, aryl, cycloalkyl, arylalkyl and acyl radicals and their substituted derivatives.

The transition metal ("M") is generally chosen from transition metals front Group 4 or 5 of the Periodic Table.

The transition metal is advantageously chosen from titanium, zirconium, hafnium and vanadium, or mixtures thereof. Titanium is particularly preferred. In the case of titanium, zirconium or hafnium, use is preferably made of tetravalent transition metal compounds, because they are generally liquid and, in any case, generally soluble and with better solubility than those in which the transition metal has a valency of less than 4. The organic oxygen-comprising compounds of a transition metal which can be used can also comprise transition metal-oxygen-transition metal bonds.

The organic oxygen-comprising compounds of a transition metal can be represented by the general formula $MO_x(OR')_{m-2x}$, in which M represents the transition metal of valency in, R' represents an organic radical as defined above and x is a number such that $0<x\leq(m-1)/2$. Use is preferably made of compounds in which x is such that $0\leq x\leq(m-2)/2$. It is obvious that the organic oxygen-comprising compounds of a transition metal can comprise several different organic radicals.

Mention may be made, among organic oxygen-comprising compounds of a transition metal, of alkoxides (such as Ti(O-n-C$_4$H$_9$)$_4$), phenoxides (such as Zr(OC$_6$H$_5$)$_4$), oxy-alkoxides (such as HfO(OC$_2$H$_5$)$_2$), condensed alkoxides (such as Ti$_2$O(O-i-C$_3$H$_7$)$_6$), carboxylates (such as Zr(OOCCH$_3$)$_4$) and enolates (such as hafnium acetylacetonate).

Use is preferably made, among all the compounds of a transition metal which are suitable, of those which only comprise transition metal-oxygen-organic radical bonds per transition metal atom, to the exclusion of any other bond. Alkoxides are highly suitable. The best results are obtained with titanium or zirconium tetraalkoxides, in particular titanium or zirconium tetrabutoxide.

Of course, several different magnesium compounds can be employed simultaneously. Likewise, several different compounds of a transition metal or several compounds for which the transition metal is different can also be employed simultaneously. The reaction of the first stage can be carried out by any appropriate known method, provided that it makes it possible to produce a complex in the liquid state. When the magnesium compound and/or the compound of a transition metal are liquid under the operating conditions of the reaction, it is desirable to carry out the reaction by simple mixing of these reactants in the absence of solvent or diluent. However, the reaction can be carried out in the presence of a diluent when the amount of liquid present in the reaction mixture is insufficient to bring the reaction to completion or when the two reactants are solid under the operating conditions of the reaction.

Complex 1$^{st}$ Stage

According to an embodiment of the present invention, the first stage consists in the formation of a Mg-M liquid complex (M is a transition metal) by reacting at least one organic oxygen-comprising compound of magnesium with at least one organic oxygen-comprising compound of a transition metal. For the purpose of the present invention and appended claims, no chlorinated and/or halogenated compound are used during this first stage The amount of the compound of a transition metal employed is usually defined with respect to the amount of the magnesium compound employed. It can vary within a wide range. It is generally at least 0.06 mole of transition metal present in the transition metal compound per mole of magnesium present in the magnesium compound, in particular at least 0.6 mole, values of at least 1.5 mole being the preferred values. The amount is usually at most 4 mole of transition metal present in the compound of a transition metal per mole of magnesium present in the magnesium compound, more specifically at most 3 mole, values of at most 2.5 mole being recommended.

The temperature at which the magnesium compound and the compound of a transition metal are brought together in the first stage of the preparation of the catalyst depends on the nature of the reactants and is preferably less than the decomposition temperature of the reactants and of the liquid complex obtained following the reaction. It is generally at least −20° C., in particular at least 0° C., temperatures of at least 20° C. being the most usual, temperatures of at least 100° C. being preferred. The temperature is usually at most 200° C., more especially at most 180° C., temperatures of at most 150° C. being advantageous, for example of approximately 140° C.

The duration of the first stage depends on the nature of the reactants and on the operating conditions and is advantageously sufficiently long to produce complete reaction between the reactants. The duration can generally vary from 10 minutes to 20 hours, more specifically from 2 to 15 hours, for example from 4 to 10 hours.

The pressure under which the reaction of the first stage is carried out and the rate of addition of the reactants are not critical factors. For reasons of convenience, the reaction is generally carried out at atmospheric pressure; the rate of addition is generally chosen so as not to bring about sudden heating of the reaction mixture due to a possible self-acceleration of the reaction. The reaction mixture is generally stirred, so as to promote its homogenization, for the duration of the reaction. The reaction can be carried out continuously or batch wise. This first stage of the preparation of the catalyst is preferably performed between neat compounds of magnesium and transition metal, i.e. in the absence of diluent.

On conclusion of the first stage of the preparation of the catalyst, a liquid complex of the magnesium compound and of the compound of a transition metal is collected, which complex can be employed as is in the subsequent stage of impregnation of the inorganic support. It can optionally and preferably be diluted in a diluent, preferably an inert diluent before its subsequent use. The diluent is generally chosen from aliphatic or cycloaliphatic hydrocarbons preferably comprising up to 20 carbon atoms, such as, for example, alkanes, such as isobutane, pentane, hexane, heptane or cyclohexane or their mixtures. Hexane is particularly highly suitable. When diluted, the diluted complex preferably comprises between 5 and 35 weight % of diluent; it is preferably characterised by a viscosity comprised between 4 and 120, more preferably between 5 and 20 mPa·s at 25° C.

Impregnation $2^{nd}$ Stage

Before impregnation, the silica support is preferably diluted in a diluent, preferably an inert diluent. The diluent is generally chosen from aliphatic or cycloaliphatic hydrocarbons preferably comprising up to 20 carbon atoms, such as, for example, alkanes, such as isobutane, pentane, hexane, heptane or cyclohexane or their mixtures. Hexane is particularly highly suitable. When diluted, the diluted silica support preferably comprises between 50 and 90 weight % of diluent, more preferably between 70 and 85 weight % of diluent. The impregnation of the inorganic support by means of the liquid complex in the second stage of the preparation of the catalyst according to the present invention can be carried out in any appropriate manner. It is usually carried out at a temperature at least equal to −10° C. and which, furthermore, does not exceed 150° C. The temperature of the impregnation generally amounts to 20° C. at least and does not exceed 100° C. Excellent results are obtained with impregnating temperatures ranging from 25 to 60° C. The duration and the pressure at which the impregnation is carried out do not constitute critical parameters. The impregnation is generally carried out at atmospheric pressure; good results are obtained when the duration is this impregnation is comprised between 2 and 4 hours in order to ensure a satisfactory homogenisation.

The amount of liquid complex impregnated in the inorganic support is chosen so that the impregnated catalyst support comprises a magnesium content of preferably at least 1 mmole and at most 2 mmole of magnesium per g of silica support, and a titanium content of preferably at least 2 mmole and at most 4 mmole of titanium per g of silica support.

Precipitation $3^{rd}$ Stage

In the third stage of the preparation of the catalyst according to the present invention the Mg-M liquid complex is precipitated on the silica by means of a halogenated organoaluminium compound. This precipitation stage has the function of reducing the valency of the transition metal and simultaneously of halogenating the magnesium compound and the transition metal compound, that is to say of substituting the alkoxy groups present in the magnesium compound and in the transition metal compound by halogens, so that the liquid complex obtained in the first stage is precipitated as a solid catalytic composition.

The halogenated organoaluminium compound is suitably chosen from organoaluminium compounds corresponding to the general formula $AlR_nX_{3-n}$, in which R is a hydrocarbon-comprising radical, X is a halogen and n is less than or equal to 2.

The halogenated organoaluminium compound advantageously corresponds to the formula $AlR_nX_{3-n}$, in which R is a hydrocarbon-comprising radical comprising up to 20 carbon atoms, X is halogen and n is less than or equal to 2. The radical preferably comprises up to 6 carbon atoms. Good results are obtained when R is an alkyl (linear or branched), cycloalkyl, arylalkyl, aryl and alkylaryl radical. The best results are obtained when R represents a linear or branched alkyl radical. X is generally chosen from fluorine, chlorine, bromine and iodine. Chlorine is particularly highly suitable. Preferably, n does not exceed 1.5, more especially does not exceed 1. Mention may be made, as examples of halogenated organoaluminium compounds which can be used in the invention, of aluminium trichloride [$AlCl_3$], ethylaluminium dichloride [$Al(C_2H_5)Cl_2$], ethylaluminiumsesquichloride [$Al_2(C_2H_5)_3Cl_3$] and diethylaluminium chloride [$Al(C_2H_5)_2Cl$]. Ethylaluminium dichloride or isobutylaluminium dichloride is preferred.

The treatment by means of the halogenated organoaluminium compound in the third stage of precipitation of the catalytic composition on the inorganic support can be carried out by any appropriate known means and preferably by gradually adding the halogenated organoaluminium compound to the inorganic support impregnated with the liquid complex resulting from the first stage.

Before the said treatment, the halogenated organoaluminium compound can advantageously be diluted in a diluent, preferably an inert diluent. The diluent is generally chosen from aliphatic or cycloaliphatic hydrocarbons preferably comprising up to 20 carbon atoms, such as, for example, alkanes, such as isobutane, pentane, hexane, heptane or cyclohexane or their mixtures. Hexane is particularly highly suitable. When diluted, the diluted halogenated organoaluminium compound preferably comprises between 40 and 90 weight % of diluent, more preferably between 50 and 80 weight % of diluent.

The amount of halogenated organoaluminium compound to be employed depends on the amounts of the magnesium compound and of the compound of a transition metal employed and is advantageously sufficient to produce the desired degree of reduction and the desired degree of halogenation. In practice, it is not advantageous to employ an amount greater than the minimum amount necessary to obtain complete reduction and, if appropriate, complete halogenation as any excess employed results in an increase in the content of aluminium in the catalyst, which is undesirable. The amount is generally at least 1 mole of aluminium per mole of magnesium employed, preferably at least 1.5 mole, values of at least 2 mole being the most usual; the amount is commonly at most 12 mole of aluminium per mole of magnesium employed, in particular at most 8 mole, values of at most 6 mole being advantageous. The amount is generally at least 0.5 mole of aluminium per mole of transition metal employed, preferably at least 0.75 mole, values of at least 1 mol being the most usual; the amount is commonly at most 6 mole of aluminium per mole of transition metal employed, in particular at most 4 mole, values of at most 3 mole being advantageous.

The temperature at which the stage of precipitation of the liquid complex is carried out is advantageously less than the boiling temperature, at ordinary pressure, of the halogenated organoaluminium compound. It is usually at least −20° C., more particularly at least 0° C., temperatures of at least 20° C. being recommended. The temperature generally does not exceed 150° C., more especially does not exceed 100° C., temperatures of at most 80° C. being the most usual.

The duration of the stage of precipitation of the liquid complex is preferably sufficient to produce complete precipitation. It can vary from 1 minute to 10 hours, more specifically from 10 minutes to 8 hours, for example from 0.5 to 5 hours.

The pressure under which the stage of precipitation of the liquid complex is carried out is not a critical factor. For reasons of convenience, the operation is generally carried out at atmospheric pressure. The rate of addition of the reactants is generally chosen so as not to bring about sudden heating of the reaction mixture due to a possible self-acceleration of the reaction. The reaction mixture is generally stirred, so as to promote its homogenization, for the duration of the reaction. The reaction can be carried out continuously or batchwise.

On conclusion of the stage of precipitation of the liquid complex by means of the halogenated organoaluminium compound, a catalyst is collected which is composed of a homogeneous precipitate (the constituents being co-precipitated from a liquid complex), on an inorganic support, of an essentially amorphous mixture of a magnesium halide and of a halide of the transition metal. They are chemically bonded complexes, produced from chemical reactions, and not the result of mixtures or of adsorption phenomena. This is because it is impossible to dissociate one or other of the constituents of these complexes by using purely physical separation methods.

The stage of precipitation of the liquid complex can advantageously be followed by a maturing treatment, the function of which is to continue the precipitation reaction and to make it possible to obtain a catalyst having improved resistance to ageing. The maturing is carried out at a temperature generally equivalent to or greater than that at which the precipitation takes place (e.g. between 40° C. and 65° C.). It is carried out for a noncritical duration generally ranging from 5 minutes to 12 hours, preferably for at least 0.5 hour.

Catalyst Precursor Composition

The present invention also provides a silica supported catalyst composition which is useful in olefin polymerization, said composition being characterised by
 a $SiO_2$ content not more than 70 weight %,
 a transition metal (M) content comprised between 2.5 and 9.1 weight %;
 a magnesium content comprised between 0.5 and 3.3 weight %;
 an aluminium content comprised between 0.3 and 5 weight % and
 a chlorine content comprised between 5 and 30 weight %;
and wherein
 the said silica support has, prior to addition of catalytically active ingredients, a residual surface hydroxyl content comprised between 0.6 and 2 mmole/g of silica, and
 the molar ratio of transition metal (M) to magnesium is comprised between 0.3 and 2.5.

The present invention also provides a catalyst composition which is useful in olefin polymerization, said composition being characterised by
 a $SiO_2$ content not more than 70 weight %,
 a transition metal (M) content comprised between 2.5 and 9.1 weight %;
 a magnesium content comprised between 0.5 and 3.3 weight %;
 an aluminium content comprised between 0.3 and 5 weight % and
 a chlorine content comprised between 5 and 30 weight %;
and said composition being obtained or obtainable by a preparation process comprising
 in a first stage, the formation of a Mg-M liquid complex by reacting at least one organic oxygen-comprising compound of magnesium with at least one organic oxygen-comprising compound of a transition metal,
 in a second stage, the impregnation of a silica support by means of the said Mg-M liquid complex, and
 in a subsequent stage, the precipitation of the said Mg-M liquid complex on the silica by means of an halogenated organoaluminium compound,
wherein the said silica support has, prior to the Mg-M liquid complex impregnation, a residual surface hydroxyl content comprised between 0.6 and 2 mmole/g of silica.

The $SiO_2$ content of the catalyst composition is not more than 70 weight %; it is preferably more than 40 weight %, more preferably more than 50 weight %.

The transition metal (M) content of the catalyst composition is comprised between 2.5 and 9.1 weight %, preferably between 3 and 8 weight %.

The magnesium content of the catalyst composition is comprised between 0.5 and 3.3 weight %, preferably between 1.5 and 2.5 weight %.

The molar ratio between the transition metal (M) and the magnesium of the catalyst composition is preferably comprised between 0.3 and 2.5, more preferably comprised between 0.4 and 2.0, most preferably comprised between 0.75 and 1.8.

The aluminium content of the catalyst composition is comprised between 0.3 and 5 weight %, preferably between 0.5 and 2.5 weight %.

The chlorine content of the catalyst composition is comprised between 5 and 30 weight %, preferably between 8 and 22 weight %.

The weight ratio (solid catalytic composition)/(silica support) is preferably comprised between 0.4 and 1.3, more preferably between 0.5 and 1, most preferably between 0.55 and 0.8.

In an alternative embodiment according to the present invention, an electron donor is added to the claimed catalyst and preparation process; examples of such electron donor can be found in EP0703247, the content of which is hereby incorporated by reference. However, and this is a preferred embodiment according to the present invention, no electron donor is used in the catalyst composition and catalyst preparation according to the present invention.

Cocatalyst

The catalysts according to the invention are particularly suited to the polymerization of olefins. The invention also relates to the use of these catalysts, in combination with a cocatalyst chosen from organometallic compounds of a metal from Groups 1, 2, 12, 13, and 14, in the polymerization of olefins. The organometallic compound which serves as activator of the catalyst and which is commonly known as "co-catalyst" can be chosen from organometallic compounds of lithium, magnesium, zinc, aluminium or tin. The best results are obtained with organoaluminium compounds.

Use may be made, as organometallic compound, of totally alkylated compounds with straight or branched alkyl chains comprising up to 20 carbon atoms, such as, for example, n-butyllithium, diethylmagnesium, diethylzinc, tetraethyltin, tetrabutyltin and trialkylaluminiums. Use may also be made of alkylmetal hydrides in which the alkyl radicals also comprise up to 20 carbon atoms, such as diisobutylaluminium hydride and trimethyltin hydride. Alkylmetal halides in which the alkyl radicals also comprise up to 20 carbon atoms, such as ethylaluminiumsesquichloride, diethylaluminium chloride and diisobutylaluminium chloride, are also suitable. Use may also be made of organoaluminium compounds obtained by reacting trialkylaluminiums or dialkylaluminium hydrides, the radicals of which comprise up to 20 carbon atoms, with diolefins comprising from 4 to 20 carbon atoms and more particularly the compounds known as isoprenylaluminiums.

Preference is generally given to trialkylaluminiums and in particular to those with straight alkyl chains comprising up to 18 carbon atoms, more particularly from 2 to 8 carbon atoms. Triethylaluminium and triisobutylaluminium are preferred.

The catalyst may be activated in situ by adding the activator and the supported catalyst separately to the polymerisation medium. It is also possible to combine the catalyst precursor and activator before introduction into the polymerisation medium, e.g., for up to about 2 hours at a temperature from about −40° C. to about 80° C.

A suitable activating amount of the activator may be used. The number of moles of activator per gram atom of titanium in the catalyst may be, e.g., from about 1 to about 100 and is preferably greater than about 5.

Polymerisation

The catalyst as described above can be used in a slurry phase process A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 50° C. to 125° C. Loop reactors are widely used in slurry polymerisation processes. In a loop reactor the slurry is typically circulated in the reactor by means of a pump or agitator. Liquid full loop reactors are particularly well known in the art and are described for example in U.S. Pat. Nos. 3,152,872, 3,242,150 and 4,613,484. Additional references of slurry operations wherein the present invention can advantageously be used are WO2007138257 and WO2006056763. Loop slurry polymerisation is typically carried out at temperatures in the range 50-125° C. and at pressures in the range 1-100 bara. The product slurry, comprising polymer and diluent and in most cases also catalyst, olefin monomer and comonomer can be discharged intermittently or continuously.

The present invention is particularly useful in a continuous gas phase process for the polymerization, at a pressure from 10 to 500 psi, of a mixture comprising from 0 to 60 mole % hydrogen, from 0 to 35 mole % of one or more $C_{3-8}$ alpha-olefins, from 15 to 100 mole % of ethylene and from 0 to 75 mole % of an inert gas such as $N_2$, conducted at a temperature from 50° C. to 125° C., preferably less than 115° C. in the presence of a catalyst and a co-catalyst as described above.

Thus, the present invention also provides the use of a catalyst system in a continuous gas phase process for the polymerization, at a pressure from 10 to 500 psi, of a mixture comprising from 0 to 60 mole % hydrogen, from 0 to 35 mole % of one or more $C_{3-8}$ alpha-olefins, from 15 to 100 mole % of ethylene and from 0 to 75 mole % of an inert gas such as $N_2$, conducted at a temperature from 50° C. to 125° C., preferably less than 115° C., wherein the catalyst system comprises a silica supported catalyst and an organoaluminium co-catalyst, said supported catalyst comprising a chlorinated-precipitated complex of Mg-M on silica characterised by a $SiO_2$ content not more than 70 weight %,
a transition metal (M) content comprised between 2.5 and 9.1 weight %;
a magnesium content comprised between 0.5 and 3.3 weight %;
an aluminium content comprised between 0.3 and 5 weight % and
a chlorine content comprised between 5 and 30 weight %, and wherein
the said silica support has, prior to addition of catalytically active ingredients, a residual surface hydroxyl content comprised between 0.6 and 2 mmole/g of silica, and
the molar ratio of transition metal (M) to magnesium is preferably comprised between 0.3 and 2.5.

The above supported catalyst is preferably obtained or obtainable by a preparation process comprising
in a first stage, the formation of a Mg-M liquid complex by reacting at least one organic oxygen-comprising compound of magnesium with at least one organic oxygen-comprising compound of a transition metal,
in a second stage, the impregnation of a silica support by means of the said Mg-M liquid complex, and
in a subsequent stage, the precipitation of the said Mg-M liquid complex on the silica by means of an halogenated organoaluminium compound,
wherein the said silica support has, prior to the Mg-M liquid complex impregnation, a residual surface hydroxyl content comprised between 0.6 and 2 mmole/g of silica. The gas phase and particularly the fluidized bed gas phase polymerization of ethylene polymers has been known for some time. A broad general description of these types of processes is set out in the paper "Gas Phase Ethylene Polymerization: Production Processes, Polymer Properties, and Reactor Modeling", by TuyuXie, Kim B. McAuley, James C. C. Hsu, and David W. Bacon, Ind. Eng. Chem. Res. 1994, 33, 449-479.

Generally, a monomer feed comprising at least ethylene and optionally one or more $C_{3-8}$ alpha-olefins is fed to a gas phase fluidized bed or stirred bed reactor. The monomer mixture optionally together with hydrogen and/or an inert gas are fed to the fluidized bed. In a fluidized bed reactor, the velocity of the gas is sufficient to suspend the bed in the fluid flow of monomer and other components. In a stirred bed reactor mechanical agitation serves to help suspend the bed. Generally a fluid bed reactor is vertical and a stirred bed reactor is horizontal. Concurrently with the monomers a co-catalyst and a supported catalyst are fed to the bed. The monomer passing over the catalyst polymerizes on the catalyst and in the pores of the catalyst causing the particle to increase in size and to break. The resulting polymer particle continues to grow as it resides in the reactor. In a stirred tank reactor the bed is stirred to a discharge section and leaves the reactor. In a fluidized bed reactor typically has a narrower section to keep the fluid (gas) velocity sufficiently high to fluidize the bed. There is an expanded zone at the top of the reactor to reduce the speed of the gas passing through the reactor so the polymer/catalyst particles fall back into the bed. The discharge is from the bed zone in the reactor.

In both the fluidized bed and stirred bed the polymer particles removed from the reactor are degassed to remove any volatile material and the resulting polymer (with entrained catalyst) may then be further treated (e.g. stabilizers added and pelletized if necessary).

In the reactor the gas phase typically comprises the monomers, a balance gas such as nitrogen, a molecular weight control agent such as hydrogen, and depending on the process possibly a condensable liquid (i.e. condensing mode such as disclosed in U.S. Pat. No. 4,543,399 issued Sep. 24, 1985 to Jenkins III et al.; U.S. Pat. No. 4,588,790 issued May 15, 1986 to Jenkins III et al.; and the so-called super condensing mode as disclosed in U.S. Pat. No. 5,352,749 issued Oct. 4, 1994 to DeChellis et al., assigned to Exxon Chemical Patents, Inc. and U.S. Pat. No. 5,436,304 issued Jul. 25, 1995 to Griffin et al., assigned to Exxon Chemical Patents, Inc.). Additional references of gas phase operations wherein the present invention can advantageously be used are WO9428032, WO2010037650 and international patent application number PCT/EP2011/070280.

The condensable liquid can be a condensable monomer, e.g. but-1-ene, hex-1-ene, 4-methylpent-1-ene, cyclooctene, 1-pentene or octene used as a comonomer, and/or an optional inert condensable liquid, e.g. inert hydrocarbon(s), such as C4-C8 alkane(s) or cycloalkane(s), particularly butane, pentane or hexane. The partial pressure of said condensable liquid under reaction conditions is preferably greater than 2 bars.

The present invention is advantageously used at very high Space Time Yields. The Space Time Yield ("STY") is expressed in [kg/(m$^3$×h)] is well known and represents the weight of polymer produced per unit of time and per unit of reactor volume. STY equal or higher than 100 kg/(m$^3$×h) and even 120 kg/(m$^3$×h) are preferred.

The reactor mixture comprises from 0 to 60 mole % hydrogen, from 0 to 35 mole % of one or more $C_{3-8}$ alpha-olefins, from 15 to 100 mole % of ethylene and from 0 to 75 mole % of an inert gas such as N2. Copolymerizable olefins include butene (1-butene), 4-methyl-1-pentene, pentene, hexene (1-hexene) and octene (1-octene), although it may be difficult to keep significant amounts of octene in the gas phase. The polymer may have a density from 0.905 to 0.965 g/cc, typically from about 0.910 to about 0.960 g/cc.

Fluidized bed gas phase reactors to make polyethylene are generally operated at temperatures from about 50° C. up to about 125° C. (provided the sticking temperature of the polymer is not exceeded) preferably from about 75° C. to about 110° C. and at pressures typically not exceeding 3,447 kPa (about 500 psi) preferably not greater than about 2,414 kPa (about 350 psi).

Polymerisation additives can also advantageously be added during the polymerisation process according to the present invention. Activity booster additives are preferred. For example, halogenated hydrocarbon compound can be advantageously introduced during the polymerisation in amounts effective for increasing the catalyst activity, the amount being preferably such that the molar of the quantity of the halogenated hydrocarbon compound to that of catalyst transition metal introduced into the polymerisation medium is greater than 0.001 and lower than 10. Said amount of halogenated hydrocarbon compound can also be advantageously controlled such that the molar ratio of the halogenated hydrocarbon compound to the cocatalyst is comprised between 0.03 and 0.2. The halogenated hydrocarbon compound can be a mono or a polyhalogenated saturated hydrocarbon and is preferably selected amongst the group consisting of methylene chloride, chloroform, carbon tetrachloride, trichloro-1,1,1 ethane and dichloro-1,2 ethane; monoalkyl chloride (R—Cl) like e.g. butyl chloride are preferably used. Examples thereof can be found in EP0703246, WO0228919 and EP1350802.

Typically the resulting polymer will comprise from 85 to 100 weight % of ethylene and from 0 to 15 weight % of one or more $C_{3-8}$ alpha-olefins. The polymer should have a molecular weight (weight average, Mw) greater than 50,000 Da.

The resulting polymers may be used in a number of applications such as film extrusion, both cast and blown film extrusion and both injection and rotomolding applications. Typically the polymer may be compounded with the usual additives including heat and light stabilizers such as hindered phenols; ultra violet light stabilizers such as hindered amine light stabilizers (HALS); process aids such as fatty acids or their derivatives and fluoropolymers optionally in conjunction with low molecular weight esters of polyethylene glycol.

The present invention will now be illustrated by the following nonlimiting examples. It will be apparent, from the results obtained in the examples by using the catalysts according to the present invention in gas phase polymerisation, that such results show the improved catalyst productivity, the improved response to hydrogen and the improved activity profile; whilst no wishing to be bound to this explanation, the Applicants believe that it is the combination of the catalyst composition together with its method of preparation which allows to obtain such results.

EXAMPLES

Catalysts Preparations
  1. Invention Catalysts (IC1 and IC2)
     a. Preparation of the complex: magnesium diethoxide was reacted under stirring for 7 hours at 140° C. with titanium tetrabutoxide in amounts such that the molar ratio of titanium to magnesium was equal to 2. The resulting complex is diluted in hexane before subsequent use; the diluted complex comprises 15 weight % of hexane.
     b. 10000 g of ES70W silica from PQ Corporation is calcined at 300° C. under nitrogen during 6 hours. The resulting silica exhibits a residual surface hydroxyl content of 1.56 mmole per g of silica. It is diluted with 55000 ml of purified hexane in a stainless steel reactor equipped with an impeller.
     c. Impregnation: 13700 ml of the diluted complex (homogeneous mixture of Mg(OEt)$_2$ and Ti(OBu)$_4$ with Ti/Mg=2 mol/mol diluted in hexane at 85 weight % concentration) are added in the reactor under agitation. The silica based slurry is agitated at 350 rpm and the temperature is set at 50° C. for 3 hours.
     d. Precipitation: a chlorinating agent (isobutyl aluminium dichloride (IBADIC) for the catalyst IC1; ethyl aluminium dichloride (EADC) for the catalyst IC2) at 50 weight % concentration in hexane is added during 1 hour with a regulation of temperature to control the exotherm of the reaction fixed at 40° C. The amount of chlorinating agent is selected such that it corresponds to Al/Mg ratio of 4.2 mol/mol for the catalyst IC1 and 6.5 mol/mol for the catalyst IC2. At the end of the reaction, the catalytic slurry is aged at the same temperature (40° C.) during 1 hour. After the ageing of the catalyst, the reactor is cooled at room temperature and purified hexane is added to the reactor in order to set the volume at 250000 ml. The agitator is then stopped and the catalytic slurry is decanted during 30 minutes, the hexane supernatant (where by-products of the chlorination reaction are diluted) is evacuated with a dip-tube until the level of solid (~125000 ml). Fresh hexane is added (~125000 ml) to recover a final volume of 250000 ml and the slurry is agitated during 10 min. The decantation/extraction sequence is repeated 5 times with every time addition of fresh hexane.

e. At the end of the catalyst washing sequence, the catalytic slurry is transferred from the reactor to a drying equipment under nitrogen atmosphere and dried under vacuum ($10^{-3}$ bar) during 4 hours.

f. Details of the preparation of catalysts IC1 and IC2 and their compositions are indicated in Table 1.

TABLE 1

| | | Catalyst IC1 | Catalyst IC2 |
|---|---|---|---|
| Support | | ES70W | ES70W |
| Treatment | ° C. | 300 | 300 |
| Surface OH concentration | mmol/g $SiO_2$ | 1.56 | 1.56 |
| Volume complex | ml | 13700 | 13700 |
| Ti/Mg | mol/mol | 2 | 2 |
| Complex concentration | mol Mg/l | 1.01 | 1.01 |
| Total volume | ml | 68700 | 68700 |
| support mass | g | 10000 | 10000 |
| support slurry concentration | g/l | 182 | 182 |
| Amount Mg/support | mol/g | 1.384E−03 | 1.384E−03 |
| Amount Ti/support | mol/g | 2.792E−03 | 2.792E−03 |
| chlorinating agent | — | IBADIC | EADC |
| chlorinating agent volume | ml | 21700 | 26700 |
| chlorinating agent amount | mol | 58.1420 | 89.9405 |
| Al/Mg | mol/mol | 4.2 | 6.5 |
| Washings | — | 6 | 6 |
| dilution coeff | — | 2 | 2 |
| Drying temperature | ° C. | 40 (under vacuum) | 40 (under vacuum) |
| Ti | wt. % | 3.18 | 7.5 |
| Mg | wt. % | 1.75 | 2.14 |
| Al | wt. % | 0.67 | 1.4 |
| Cl | wt. % | 9.8 | 16.8 |
| Si | wt. % | 29.5 | 26.6 |
| $SiO_2$ | wt. % | 63.3 | 57.0 |
| Ti/Mg | mol/mol | 0.92 | 1.78 |
| Cl/Mg | mol/mol | 3.83 | 5.37 |

TABLE 1-continued

| | | Catalyst IC1 | Catalyst IC2 |
|---|---|---|---|
| D50 | μm | 45.9 | 44.3 |
| D10 | μm | 14.3 | 18.3 |
| D90 | μm | 93.9 | 77.5 |
| Fines < 15 μm | vol. % | 10.4 | 7.8 |

2. Comparative Catalyst (C1)

The catalyst is a silica supported catalyst which is the same as one disclosed in the comparative example 1 of WO99/05187 (1 mmole DBM/g silica, 0.44 mmole TEOS/g silica, 1 mmole $TiCl_4$/g silica).

Polymerisations

Manufacture of a Copolymer of Ethylene and 1-butene in Gas Phase

The operation was carried out in a gas phase polymerisation reactor consisting essentially of a vertical cylinder of 74 cm diameter and with a height of 6 m, with a disengagement chamber above it, fitted in its lower part with a fluidisation grid and a recycling conduit connecting the top of the disengagement chamber to the lower part of the reactor, the recycling conduit being equipped with a cyclone, a heat exchanger, a separator, a compressor and feed conduits for ethylene, for 1-butene, for hydrogen and for pentane. The reactor was also equipped with a feed conduit for catalyst and a conduit for drawing off copolymer.

The reactor contained a fluidised bed of particles of polymer being formed, which had a height of 5.4 m and through which passed a stream of reaction gas mixture, which had an upward velocity of 50 cm/s, an absolute pressure and a temperature as indicated in the Table below.

The reaction gas mixture compositions are indicated in the Table. The reactor was fed with catalyst prepared previously. It was also fed separately with triethylaluminium.

Under these conditions a copolymer was drawn off. The properties of the polymer are indicated in Table 2. Said results show the improved catalyst productivity and the improved response to hydrogen obtained by using the catalysts according to the present invention in gas phase polymerisation.

TABLE 2

| | HDPE | | HDPE | | LLDPE | |
|---|---|---|---|---|---|---|
| Density n.a (kg/m³) | 960 | | 953 | | 920 | |
| $MI_{2.16}$ (g/10 mn) | 7.5 | | 27 | | 0.9 | |
| Catalyst | C1 | IC1 | C1 | IC1 | C1 | IC2 |
| Pressure (bar) | 20.3 | 20.3 | 20.7 | 20.7 | 20.3 | 20.3 |
| Temperature (° C.) | 92 | 92 | 94 | 94 | 88 | 88 |
| Ethylene partial pressure (bar) | 8.4 | 8.4 | 7.4 | 7.4 | 8.33 | 8.33 |
| Space Time Yield (kg/h/m³) | 130 | 130 | 120 | 120 | 110 | 110 |
| RH2 (mol/mol) | 0.59 | 0.55 | 0.8 | 0.712 | 0.17 | 0.11 |
| RC4 (mol/mol) | 0.009 | 0.01 | 0.065 | 0.054 | 0.35 | 0.349 |
| Pentane partial pressure (bar) | 3 | 3.5 | 4 | 4 | 1.81 | 2.85 |
| Productivity (g/g) | 5300 | 10600 | 7000 | 12200 | 11200 | 18750 |

RH2 = pH2/pC2

RC4 = pC4/pC2

Productivity is given in g of polymer per g of catalyst

The invention claimed is:

1. Silica supported catalyst composition which is useful in olefin polymerization, said composition comprising:
a $SiO_2$ content not more than 70 weight %;
a transition metal (M) content comprised between 3 and 9.1 weight %;
a magnesium content comprised between 0.5 and 3.3 weight %;
an aluminium content comprised between 0.3 and 5 weight % and
a chlorine content comprised between 5 and 30 weight %; and wherein
the said silica support has, prior to addition of catalytically active ingredients, a residual surface hydroxyl content comprised between 0.6 and 2 mmole/g of silica, and
the molar ratio of transition metal (M) to magnesium is comprised between 0.3 and 2.5.

2. Catalyst composition which is useful in olefin polymerization comprising:
a $SiO_2$ content not more than 70 weight %,
a transition metal (M) content comprised between 3 and 9.1 weight %;
a magnesium content comprised between 0.5 and 3.3 weight %;
an aluminium content comprised between 0.3 and 5 weight % and
a chlorine content comprised between 5 and 30 weight %;
wherein said composition is obtained by a preparation process comprising
in a first stage, the formation of a Mg-M liquid complex (M is a transition metal) in the absence of halogen containing compound by reacting at least one organic oxygen-comprising compound of magnesium with at least one organic oxygen-comprising compound of a transition metal,
in a second stage, the impregnation of a silica support by means of the said Mg-M liquid complex, and
in a subsequent stage, the precipitation of the said Mg-M liquid complex on the silica by means of an halogenated organoaluminium compound,
wherein
during the first stage reaction, the molar amount of the transition metal M added per mole of magnesium is comprised between 0.06 and 4, and
the said silica support has, prior to the Mg-M liquid complex impregnation, a residual surface hydroxyl content comprised between 0.6 and 2 mmole/g of silica.

3. Catalyst composition according to claim 2 wherein the silicon dioxide content of the catalyst composition is more than 40 weight %.

4. Process for polymerizing olefins comprising contacting olefins with the catalyst composition according to claim 2 together with a co-catalyst in a continuous slurry phase or a continuous gas phase process for the polymerisation of olefins wherein the co-catalyst is chosen from organometallic compounds of a metal from Groups 1, 2, 12, 13, and 14.

5. Catalyst composition which is useful in olefin polymerization characterised by
a $SiO_2$ content not more than 70 weight %,
a transition metal (M) content comprised between 3 and 9.1 weight %;
a magnesium content comprised between 0.5 and 3.3 weight %;
an aluminium content comprised between 0.3 and 5 weight % and
a chlorine content comprised between 5 and 30 weight %;
wherein said composition is obtained by a preparation process comprising
in a first stage, the formation of a Mg-M liquid complex (M is a transition metal) by reacting at least one organic oxygen-comprising compound of magnesium with at least one organic oxygen-comprising compound of a transition metal, wherein the organic oxygen-comprising compounds of magnesium only comprise magnesium-oxygen-organic radical bonds per magnesium atom, to the exclusion of any other bond and wherein the organic oxygen-comprising compounds of a transition metal only comprise transition metal-oxygen-organic radical bonds per transition metal atom, to the exclusion of any other bond,
in a second stage, the impregnation of a silica support by means of the said Mg-M liquid complex, and
in a subsequent stage, the precipitation of the said Mg-M liquid complex on the silica by means of an halogenated organoaluminium compound,
wherein
during the first stage reaction, the molar amount of the transition metal M added per mole of magnesium is comprised between 0.06 and 4, and
the said silica support has, prior to the Mg-M liquid complex impregnation, a residual surface hydroxyl content comprised between 0.6 and 2 mmole/g of silica.

6. Catalyst composition according to claim 5 wherein the silicon dioxide content of the catalyst composition is more than 40 weight %.

7. Process for polymerizing olefins comprising contacting olefins with the catalyst composition according to claim 5 together with a co-catalyst in a continuous slurry phase or a continuous gas phase process for the polymerisation of olefins wherein the co-catalyst is chosen from organometallic compounds of a metal from Groups 1, 2, 12, 13, and 14.

8. Gas phase process for the (co-)polymerisation of olefins, comprising contacting olefins with a silica supported polymerisation catalyst having the following characteristics:
a $SiO_2$ content not more than 70 weight,
a transition metal (M) content comprised between 3 and 9.1 weight %;
a magnesium content comprised between 0.5 and 3.3 weight %;
an aluminium content comprised between 0.3 and 5 weight % and
a chlorine content comprised between 5 and 30 weight % wherein
the said silica support has, prior to addition of catalytically active ingredients, a residual surface hydroxyl content comprised between 0.6 and 2 mmole/g of silica, and
the molar ratio of transition metal (M) to magnesium is comprised between 0.3 and 2.5, and
wherein the productivity is greater than 10000 g of polymer per g of catalyst, space time yield is greater than 100 kg/m$^3$/h and the partial pressure of hydrocarbon condensable under reaction conditions is greater than 2 bar.

9. Catalyst composition according to claim 3 wherein the silicon dioxide content of the catalyst composition is more than 50 weight %.

10. Catalyst composition according to claim 6 wherein the silicon dioxide content of the catalyst composition is more than 50 weight %.

11. The process according to claim 4 wherein the co-catalyst is chosen from one or more trialkylaluminiums.

12. The process according to claim 7 wherein the co-catalyst is chosen from one or more trialkylaluminiums.

13. The catalyst composition according to claim 2 wherein the complex impregnation (second stage) is performed on a silica which has been subjected to a thermal treatment step at a temperature of at least 200° C. for up to 24 hours.

14. The catalyst composition according to claim 13 wherein the thermal treatment step is at a temperature 250° C. to 350° C. for 4 to 10 hours.

15. The catalyst composition according to claim 2 wherein the organic oxygen-comprising compound of magnesium is a magnesium dialkoxide.

16. The catalyst composition according to claim 2 wherein the organic oxygen-comprising compound of a transition metal is a titanium tetraalkoxide, a zirconium tetraalkoxide, or a mixture thereof.

17. The catalyst composition according to claim 2 wherein during the impregnation stage, the amount of liquid complex impregnated in the inorganic support is selected such that the impregnated silica support comprises
- a magnesium content comprised between 1 mmole and 2 mmole of magnesium per g of silica support, and
- a titanium content comprised between 2 mmole and 4 mmole of titanium per g of silica support.

18. The catalyst composition according to claim 2 wherein the halogenated organoaluminium compound used in the precipitation stage is chosen from organoaluminium compounds corresponding to the general formula Al $R_nX_{3-n}$, in which R is a hydrocarbon-comprising radical comprising up to 20 carbon atoms, X is a halogen and n is less than or equal to 2.

19. The catalyst composition according to claim 5 wherein the complex impregnation (second stage) is performed on a silica which has been subjected to a thermal treatment step at a temperature of at least 200° C. for up to 24 hours.

20. The catalyst composition according to claim 19 wherein the thermal treatment step is at a temperature 250° C. to 350° C. for 4 to 10 hours.

21. The catalyst composition according to claim 5 wherein the organic oxygen-comprising compound of magnesium is a magnesium dialkoxide.

22. The catalyst composition according to claim 5 wherein the organic oxygen-comprising compound of a transition metal is a titanium tetraalkoxide, a zirconium tetraalkoxide, or a mixture thereof.

23. The catalyst composition according to claim 5 wherein during the impregnation stage, the amount of liquid complex impregnated in the inorganic support is selected such that the impregnated silica support comprises
- a magnesium content comprised between 1 mmole and 2 mmole of magnesium per g of silica support, and
- a titanium content comprised between 2 mmole and 4 mmole of titanium per g of silica support.

24. The catalyst composition according to claim 5 wherein the halogenated organoaluminium compound used in the precipitation stage is chosen from organoaluminium compounds corresponding to the general formula Al $R_nX_{3-n}$, in which R is a hydrocarbon-comprising radical comprising up to 20 carbon atoms, X is a halogen and n is less than or equal to 2.

* * * * *